United States Patent [19]

Kawasaki et al.

[11] Patent Number: 4,796,346
[45] Date of Patent: Jan. 10, 1989

[54] VEHICLE BODY POSITIONING APPARATUS

[75] Inventors: Yoshinobu Kawasaki; Ryo Niikawa; Yuzi Ikeda, all of Sayama, Japan

[73] Assignee: Honda Giken Kogyo Kabushiki Kaisha, Tokyo, Japan

[21] Appl. No.: 67,171

[22] Filed: Jun. 29, 1987

[30] Foreign Application Priority Data

Jun. 30, 1986 [JP] Japan ................ 61-151735

[51] Int. Cl.$^4$ .............................................. B23D 21/00
[52] U.S. Cl. ........................................ 29/700; 29/467; 29/559
[58] Field of Search ................ 29/334, 467, 469, 559, 29/700

[56] References Cited

U.S. PATENT DOCUMENTS 4,143,868  3/1979  Bergman .......................... 29/559 X
4,238,951 12/1980  Grainger et al. ................. 29/559 X
4,589,184  5/1986  Asano et al. ..................... 29/430
4,723,356  2/1988  Sakamoto et al. ................ 29/714

FOREIGN PATENT DOCUMENTS 61-4888    1/1986  Japan .
1564669    4/1980  United Kingdom .
2075437A  11/1981  United Kingdom .

Primary Examiner—Timothy V. Eley
Attorney, Agent, or Firm—Armstrong, Nikaido, Marmelstein & Kubovcik

[57] ABSTRACT

Apparatus for properly locating and positioning a vehicle body carried by a conveying hanger to a work station which includes a pair of locating pins on the hanger and locating the vehicle body relative to the hanger. A pair of depending standard pins are also provided on the hanger and clamp means provided at the work station clamp the depending standard pins to properly position the hanger and vehicle body relative to the work station.

3 Claims, 5 Drawing Sheets

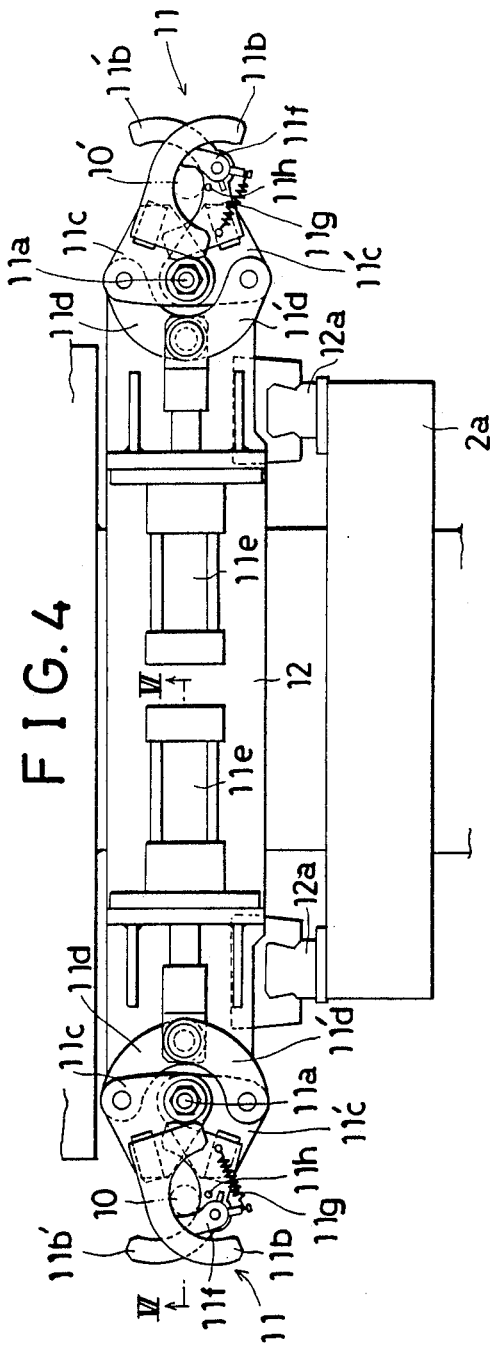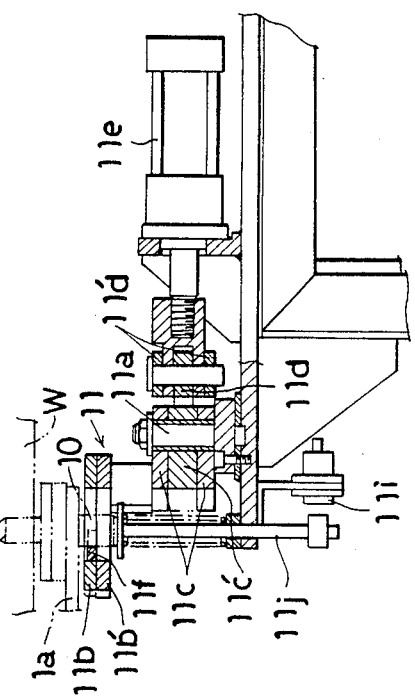

VEHICLE BODY POSITIONING APPARATUS

BACKGROUND OF THE INVENTION

This invention relates to a vehicle body positioning apparatus and, more specifically, to apparatus for locating a vehicle body in a predetermined position at a work station in a automobile manufacturing assembly line.

In those instances where vehicle bodies are conveyed by a hanger, one might consider the use of an arrangement where the hanger is stopped at a predetermined location and the vehicle body is lifted from the hanger and set in position by a lifting device having means for positioning the vehicle body.

With such an arrangement, however, it often happens that the desired predetermined accurate position of the vehicle body cannot be provided by the lifting device because the vehicle body is not properly positioned on the conveying hanger and/or the conveying hanger is not stopped precisely at the desired stop position of the hanger.

There is also known, as disclosed in Japanese Unexamined Patent Application Publication No. Sho 61 (1986) - 21873, a type of apparatus that is useful in detecting by means of a visual sensor the extent of error in the improper position of a vehicle body at a work station and compensation for such error is made by means of a position compensation control provided on the automatic machine at that work station. However, this apparatus is complicated and expensive. It is therefore desirable to have some means by which it is possible to accurately set a vehicle body in the desired predetermined position and thereby eliminate the need for a position error detector and position compensation control of the automatic machine at that particular work station.

The present invention avoids the foregoing problems and difficulties by providing an apparatus which prevents an error in positioning a vehicle body on a hanger and also Position errors resulting from the hanger being stopped at the wrong or inprecise position relative to a work station.

SUMMARY OF THE INVENTION

The apparatus of the present invention includes a hanger for conveying a vehicle body by means of a pair of left and right sections adapted to support the vehicle body. A pair of locating pins with each locating pin on one of the left and right sections of the hanger engage apertures in the vehicle body and properly locate the vehicle body relative to the hanger. A pair of left and right standard pins project downward from respective ones of the left and right sections of the hanger. A machine base located at a work stop position below the conveying hanger has left and right clamp means arranged to clamp respective ones of the left and right standard pins and thereby position the hanger and the vehicle body at a predetermined position relative to the machine base.

In the preferred embodiment, the machine base also includes a pair of front and rear lifters which are adapted to engage and lift the vehicle body after the hanger has been properly positioned by the clamp means and position the vehicle body for work to be performed at that work station.

The foregoing features as well as the advantages and benefits of the invention will become apparent from the following description taken in conjunction with the accompanying drawings.

BRIEF DESCRIPTION OF THE DRAWINGS

FIG. 4 is an enlarged top plan view of an important portion of the apparatus of FIG. 1, FIG. 6 is a front view partly in section taken along the line VI—VI of FIG. 4.

DESCRIPTION OF THE PREFERRED EMBODIMENT

Figure 1:
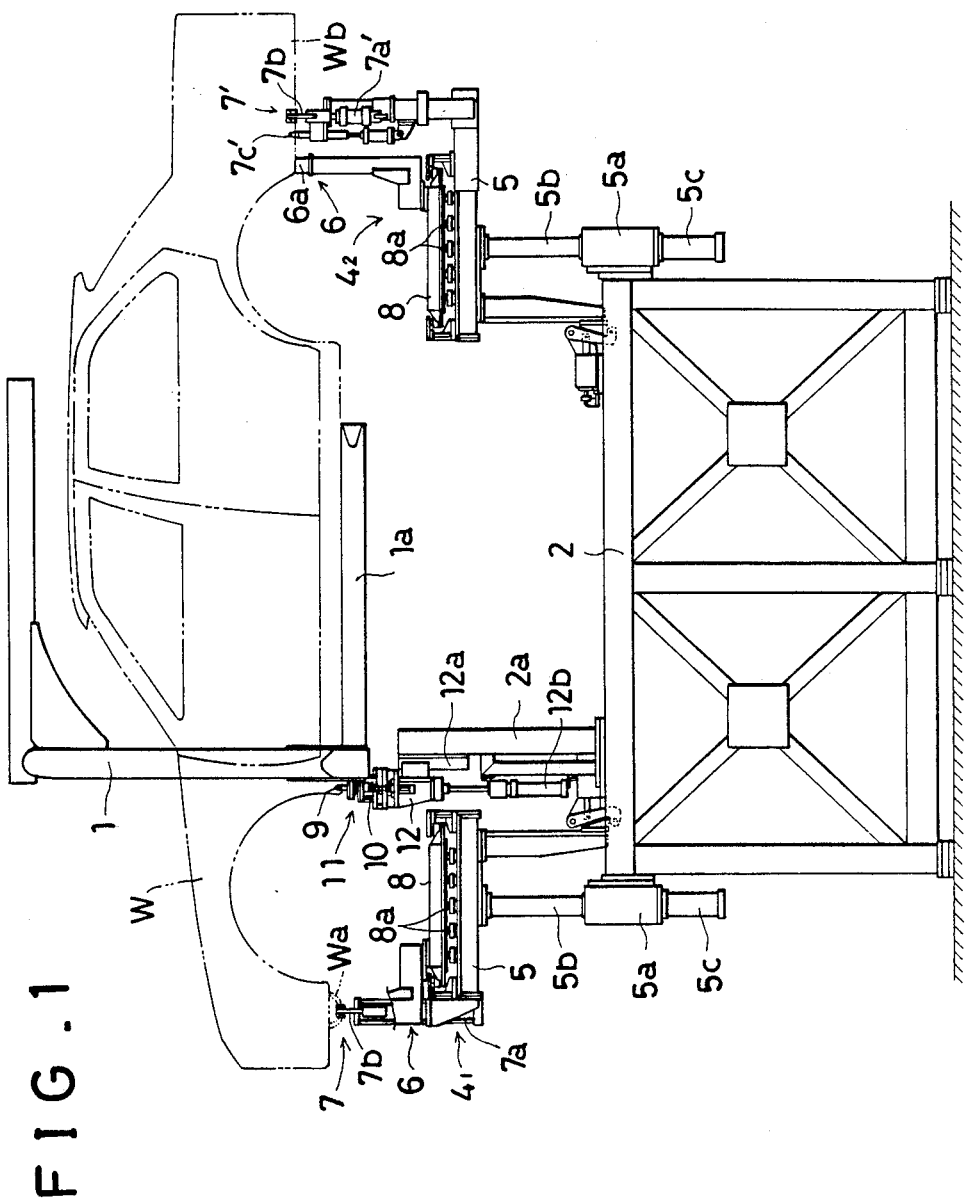
FIG. 1 is a side elevation showing apparatus including one embodiment of the invention.

The preferred embodiment of the invention will now be described with reference to the accompanying drawings wherein like reference numerals refer to like parts and prime reference numerals refer to like parts of opposite hand or oppositely disposed like parts.

Figure 8:
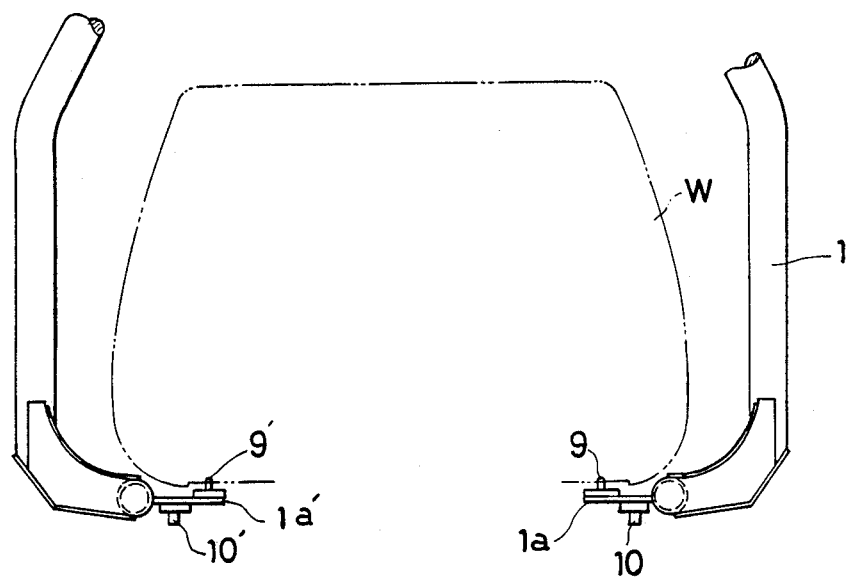
FIG. 8 is a front view of a hanger.

With reference to the drawings, FIGS. 1 and 8 show a hanger 1 having at its lower portion a pair of left and right vehicle body resting sections $1a$ and $1a'$ for supporting side sill portions of a vehicle body W.

Figure 2:
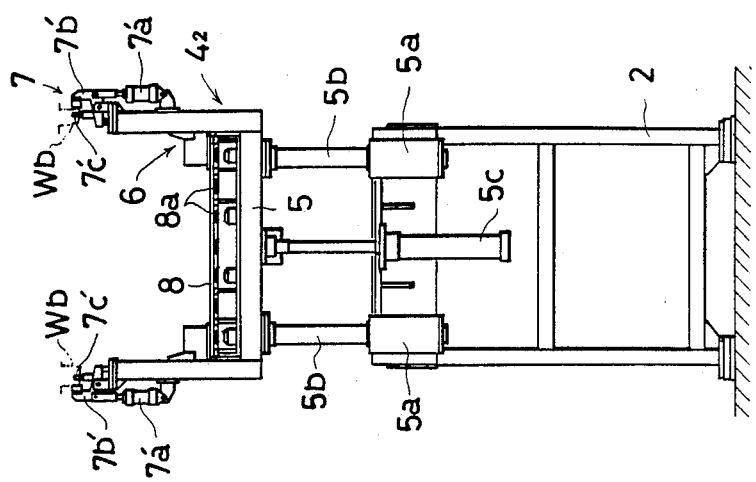
FIG. 2 is a front view of the apparatus of FIG. 1.
Figure 3:
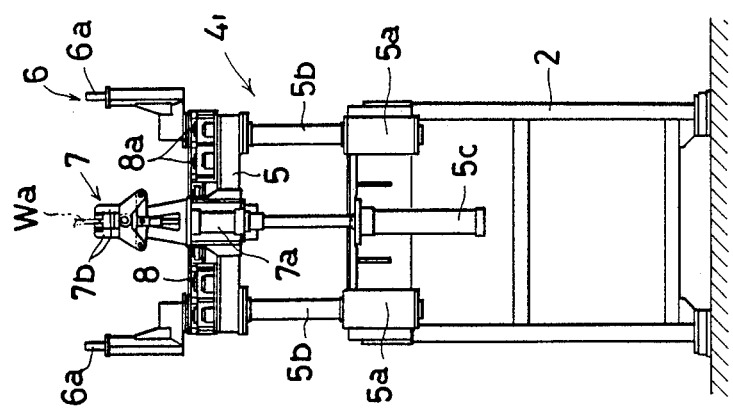
FIG. 3 is a rear view of the apparatus of FIG. 1.

As shown by FIGS. 1-3, a machine base 2 is provided below a work station stop position of the hanger 1. A pair of front and rear lifters $4_1$ and $4_2$ are provided on the machine base 2. Final positioning of the vehicle body W may be carried out by lifting the vehicle body W from the hanger 1 with the two lifters $4_1$ and $4_2$.

Each of the lifters $4_1$ and $4_2$ is provided on an elevating base 5, which is supported by vertical guide rods $5b$, $5b$ passing through guide sleeves $5a$, $5a$ fixed to the machine base 2 and is movable upwards and downwards by a cylinder $5c$. A vehicle body receiving means 6 for supporting the vehicle body W and a vehicle body positioning means 7 for positioning the vehicle body W are provided on each elevating base 5.

The front vehicle body receiving means 6 comprises a pair of left and right members $6a$, $6a$ provided vertically on a base 8 which is freely movable in the horizontal direction, through a flat bearing $8a$, on the elevating base 5. The vehicle body positioning means 7 provided on the front lifter $4_1$ comprises a pair of clamp members $7b$, $7b$ which are operated to open and close by a cylinder $7a$ for clamping from both sides a hitch member Wa attached to a front end portion of a lower surface of the vehicle body W.

The vehicle body positioning means 7 provided on the rear lifter $4_2$ comprises a pair of clamp members $7b'$, $7b'$ which are operated to close and open by respective cylinders $7a'$, $7a'$ from outside in relation to a pair of left and right frame members Wb, Wb on a lower surface of the vehicle body W, and a pair of positioning pins $7c'$, $7c'$ which are arranged to be brought into engagement with the two respective frame members Wb, Wb.

Thus, when the vehicle body W is supported on the vehicle body receiving means 6, 6, the vehicle body W may be lifted from the resting sections $1a$, $1a$ of the hanger 1 and raised to the desired height or elevation by raising the elevating bases 5, 5 of the two lifters $4_1$ and $4_2$. Then the clamp members $7b$, $7b$ and $7b'$, $7b'$ are closed to set the vehicle body W in a predetermined position in the lateral direction and the positioning pins 7c', 7c' are brought into engagement with the frame members Wb to set the vehicle body W in a predetermined position in the longitudinal direction.

In order that the vehicle body W may be set in proper position in relation to the two lifters $4_1$ and $4_2$, the left and right vehicle body resting sections 1a and 1a' of the hanger 1 are provided with respective locating pins 9, 9' for engaging apertures in the vehicle body W, and respective standard pins 10, 10' projecting downwards therefrom. A pair of left and right clamp means 11 for clamping the respective standard pins 10 and 10' are provided on the machine base 2.

Figure 5:
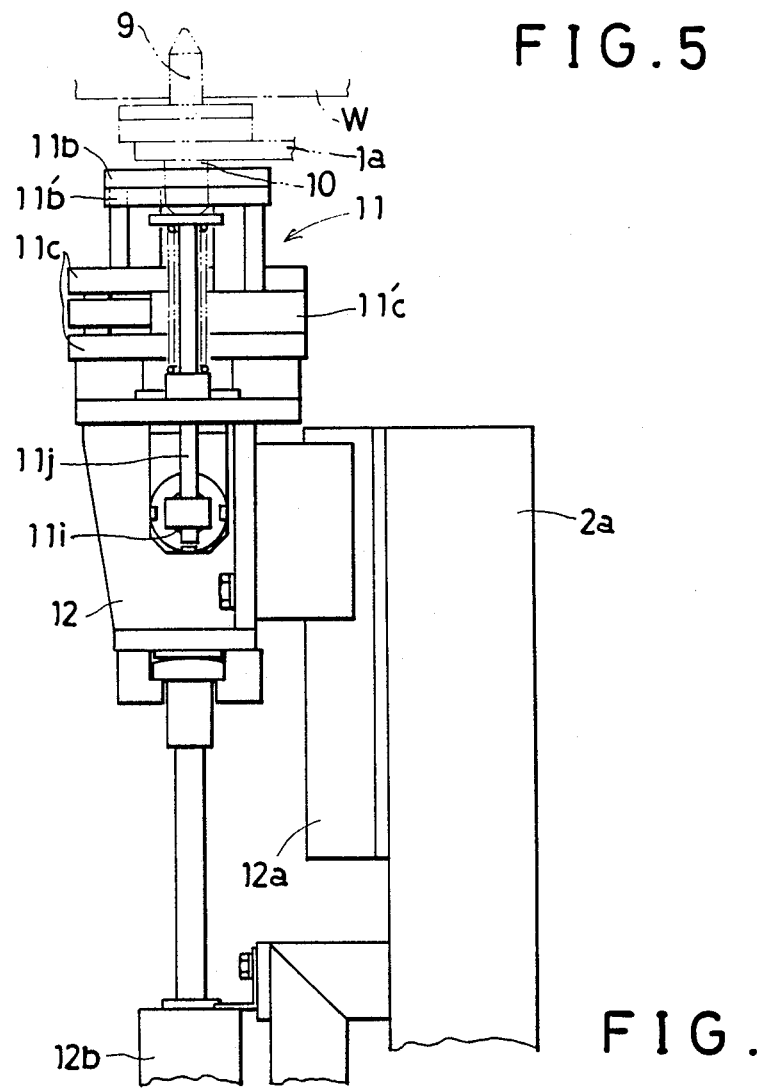
FIG. 5 is a side elevation of the apparatus of FIG. 4.

Details of the clamp means 11 are shown in FIGS. 4–6. A machine frame 2a extending vertically from the machine base 2 is provided with a laterally extending elevating frame 12 which is movable upwards and downwards by a cylinder 12b on a pair of vertically extending guide rails 12a, 12a fixed to the machine frame 2a. The clamp means 11, are respectively provided on both left and right sides of the elevating frame 12.

Each clamp means 11 is constructed with a pair of front and rear clamp arms 11b and 11b', each being in the form of an arc viewed from above, and pivotally attached, at their respective base end portions 11c and 11c', to a vertical shaft 11a provided on the elevating frame 12 and through links 11d, 11d' to a cylinder 11e so that the two claim arms 11b and 11b' may be operated to open and close by the cylinder 11e.

Figure 7:
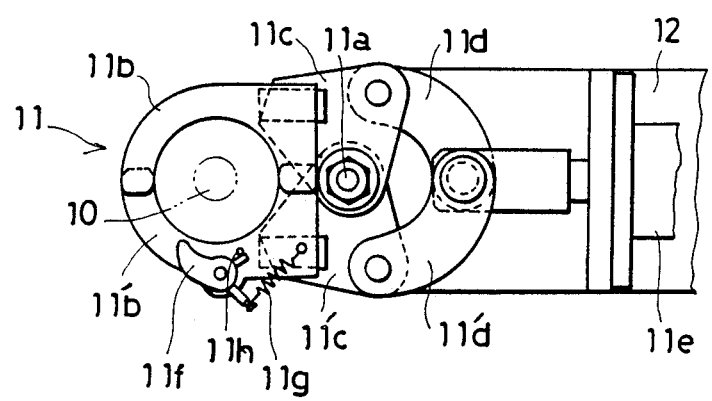
FIG. 7 is a top plan view of a clamp means in its open condition.

When the clamp means 11 are open as shown by FIG. 7, a circular opening which is substantially larger in diameter than the standard pin 10 is formed by each pair of clamp arms 11b and 11b'. Thus, even if the stop position of the hanger 1 is not precisely at the desired predetermined position, the standard pin 10 will still be located between the two clamp arms 11b and 11b' as the elevating frame 12 is raised and then, when the two clamp arms 11b and 11b' are closed, the standard pins 10 and 10' will be held clamped between the clamp arms 11b and 11b' as shown by dotted lines in FIG. 4. The vehicle body W can then be set in a predetermined position as previously described in conjunction with the lifters $4_1$ and $4_2$.

The clamping force of the clamp arms 11a and 11b as shown by FIG. 4 is sufficiently large against the standard pins 10 and 10' in the longitudinal direction of the vehicle body but the clamp force in the lateral direction may not be adequate. Accordingly, in the illustrated example, a small clamp member 11f is pivotally attached to each of the arms 11b' and arranged to be brought into abutment with the lateral side surface of the standard pins 10 and 10' by being pushed from the outside thereof by the clamp arms 11b.

With reference to FIGS. 4 and 7, there is shown a biasing spring 11g and a stopper 11h for each of the small clamp members 11f.

In FIG. 6, a proximity switch 11i is shown for detecting movement of a cushion rod 11j which is pushed downward by standard pin 10 to indicate that standard pin 10 is located in the space between the two clamp arms 11b and 11b' and is in position to be clamped.

The operation of the preferred embodiment will now be described.

After the hanger 1 is stopped, the elevating frame 12 is moved upwards, and the clamp arms 11b and 11b' of each of the right and left clamp means 11, are closed to clamp the standard pins 10 and 10' projecting from the portions 1a and 1a' of hanger 1 and thereby set the pins 10 and 10' and the hanger 1 in a predetermined position relative to the machine base 2. The vehicle body W which is positioned by the locating pins 9 in relation to the hanger 1 and the standard pins 10 and 10' is also set in a predetermined position. Thereafter, the lifters $4_1$ and $4_2$ are operated to left the vehicle body W from the hanger 1 and effect the final positioning thereof.

Thus according to this invention, by clamping the standard pins projecting from the hanger by the respective clamp means on the machine base, the hanger and the vehicle body are precisely set or located in a predetermined position relative to the machine base, and the final positioning of the vehicle body can be achieved simply and smoothly by a lifter device or like means. The locating and positioning apparatus is relatively simple in construction and inexpensive.

What is claimed is:

1. Apparatus for positioning a vehicle body comprising:
    a hanger for conveying a vehicle body, said hanger having a pair of left and right sections adapted to support said vehicle body,
    a pair of locating pins with each locating pin on one of said left and right sections of said hanger and engaging respective apertures in said vehicle body to locate said vehicle body relative to said hanger,
    a pair of left and right standard pins with each standard pin projecting down from respective ones of said left and right sections of said hanger,
    a machine base located at a work station stop position below said conveying hanger, and
    means on said base including left and right clamp means arranged to clamp respective ones of said left and right standard pins and thereby position said hanger at a predetermined position relative to said machine base.

2. The apparatus defined in claim 1 further including a pair of front and rear lifters on said machine base, said front and rear lifters being adapted to engage and lift said vehicle body after said hanger has been positioned by said clamp means and position said vehicle body for work to be performed at said work station.

3. The apparatus defined by claim 1 further including a pair of front and rear lifters on said machine base, each of said front and rear lifters including vehicle body receiving means for supporting said vehicle body and vehicle body positioning means for positioning said vehicle body.

* * * * *